(12) United States Patent
Thomas et al.

(10) Patent No.: US 10,925,701 B2
(45) Date of Patent: *Feb. 23, 2021

(54) DISPOSABLE DENTAL VALVE DEVICE HAVING A SOCKET END

(71) Applicant: STOMA VENTURES, LLC, Chesterfield, MO (US)

(72) Inventors: Charles Thomas, Vero Beach, FL (US); Edward Arguello, Weston, FL (US)

(73) Assignee: STOMA VENTURES, LLC, Chesterfield, MO (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/984,758

(22) Filed: May 21, 2018

(65) Prior Publication Data

US 2018/0280127 A1 Oct. 4, 2018

Related U.S. Application Data

(63) Continuation-in-part of application No. 14/925,749, filed on Oct. 28, 2015, now Pat. No. 10,010,712.

(51) Int. Cl.
*A61C 17/12* (2006.01)
*A61C 17/06* (2006.01)
(Continued)

(52) U.S. Cl.
CPC .............. *A61C 17/13* (2019.05); *A61C 1/052* (2013.01); *A61C 17/04* (2013.01); *A61C 17/125* (2019.05);
(Continued)

(58) Field of Classification Search
CPC ...... F16K 15/144; F16K 15/16; F16K 15/181; F16K 15/185; F16K 15/188;
(Continued)

(56) References Cited

U.S. PATENT DOCUMENTS

| 68,112 A | * | 8/1867 | Rhodes | ................... F16L 27/04 285/261 |
| 203,094 A | * | 4/1878 | Wakeman | ............. F16L 58/182 285/55 |

(Continued)

FOREIGN PATENT DOCUMENTS

| DE | 2208288 A1 | * | 8/1973 | .............. F16L 27/04 |

OTHER PUBLICATIONS

Beall, Glenn. By Design, Part Design 107: Draft Angles. Plastics Today [online], Feb. 2000 [retrieved on Aug. 27, 2020]. Retrieved from the Internet: <URL:https://www.plasticstoday.com/injection-molding/design-part-design-107-draft-angles> (Year: 2000).*

*Primary Examiner* — Kenneth Rinehart
*Assistant Examiner* — Richard K. Durden
(74) *Attorney, Agent, or Firm* — David H. Chervitz

(57) ABSTRACT

A disposable dental valve device is disclosed having a valve body having an interior, a tip receiving end for receiving a tip, a socket hose receiving end for receiving a tube having a beaded end, a lumen formed between the tip receiving end and the socket hose receiving end, and a partial opening formed in the valve body, a rotatable valve sealing body adapted to be inserted into the partial opening, and the rotatable valve sealing body having a bore for alignment with the lumen formed between the tip receiving end and the socket hose receiving end.

6 Claims, 15 Drawing Sheets

(51) Int. Cl.
  *F16K 15/18* (2006.01)
  *F16K 15/14* (2006.01)
  *A61C 1/05* (2006.01)
  *F16K 5/02* (2006.01)
  *F16K 15/16* (2006.01)
  *A61C 1/00* (2006.01)
  *A61C 17/08* (2006.01)
  *F16L 27/04* (2006.01)
  *F16L 47/18* (2006.01)

(52) U.S. Cl.
  CPC .......... *F16K 5/0207* (2013.01); *F16K 15/144* (2013.01); *F16K 15/16* (2013.01); *F16K 15/188* (2013.01); *A61C 1/0076* (2013.01); *A61C 17/08* (2019.05); *F16L 27/04* (2013.01); *F16L 47/18* (2013.01)

(58) Field of Classification Search
  CPC ..... F16K 5/0207; A61C 1/0061; A61C 17/04; A61C 17/06; A61C 17/096; A61C 17/12; A61C 17/125; A61C 17/13; A61M 39/24; A61M 2039/226; A61M 2039/244; Y10T 137/86944; F16L 27/04; F16L 37/52; F16L 47/18
  USPC .......................................................... 285/261
  See application file for complete search history.

(56) References Cited

U.S. PATENT DOCUMENTS

| | | | | |
|---|---|---|---|---|
| 1,087,006 A * | 2/1914 | Fitzsimons | ............... | B05B 1/12 239/507 |
| 1,528,703 A * | 3/1925 | Showers | ............... | F16K 5/0207 137/269.5 |
| 1,528,967 A * | 3/1925 | Bersted | ............... | F16N 21/00 184/105.3 |
| 2,711,586 A * | 6/1955 | Groves | ............... | A61C 1/08 433/95 |
| 2,771,309 A * | 11/1956 | Clark, Jr. | ............... | F21V 21/29 285/148.4 |
| 3,474,818 A * | 10/1969 | Hartman | ............... | F16K 5/045 137/269.5 |
| 3,638,973 A * | 2/1972 | Poletti | ............... | A61B 17/02 285/184 |
| 3,695,646 A * | 10/1972 | Mommsen | ............... | F16L 37/144 285/261 |
| 3,718,352 A * | 2/1973 | Northcutt | ............... | F16L 27/06 285/261 |
| 4,088,348 A * | 5/1978 | Shemtov | ............... | F16L 27/04 285/184 |
| 4,294,472 A * | 10/1981 | Stolecki | ............... | F16L 27/026 285/261 |
| 4,423,559 A * | 1/1984 | Malin | ............... | F16L 27/04 15/410 |
| 4,736,771 A * | 4/1988 | McCafferty | ............... | F16K 15/188 137/614.17 |
| 4,797,098 A | 1/1989 | Kawata | | |
| 4,875,718 A * | 10/1989 | Marken | ............... | A61M 39/1055 285/148.15 |
| 4,917,408 A * | 4/1990 | Vidrine | ............... | F16L 27/04 285/261 |
| 5,013,300 A * | 5/1991 | Williams | ............... | A61M 1/008 433/91 |
| 5,449,206 A * | 9/1995 | Lockwood | ............... | F16L 11/18 138/120 |
| 5,464,350 A | 11/1995 | Bierbaum | | |
| 5,645,539 A * | 7/1997 | Solomon | ............... | A61M 39/0247 285/261 |
| 5,725,374 A | 3/1998 | Young | | |
| 5,876,384 A * | 3/1999 | Dragan | ............... | A61C 17/04 433/91 |
| 6,059,325 A * | 5/2000 | Heckele | ............... | A61M 39/10 285/261 |
| 6,203,321 B1 * | 3/2001 | Helmer | ............... | A61C 17/04 433/95 |
| 8,256,464 B2 | 9/2012 | Bushman et al. | | |
| 8,763,638 B2 | 7/2014 | Deubler | | |
| 9,277,978 B2 * | 3/2016 | Williams | ............... | A61C 17/04 |
| 9,693,842 B2 * | 7/2017 | Thomas | ............... | A61C 1/0061 |
| 9,907,632 B2 * | 3/2018 | Thomas | ............... | A61C 1/0061 |
| 9,980,790 B2 * | 5/2018 | Thomas | ............... | A61C 1/0061 |
| 10,010,712 B2 * | 7/2018 | Thomas | ............... | A61M 39/24 |
| 10,799,694 B2 * | 10/2020 | Thomas | ............... | A61M 39/24 |
| 2003/0219696 A1 | 11/2003 | Moreland | | |
| 2008/0289696 A1 * | 11/2008 | Bushman | ............... | A61C 1/16 137/217 |
| 2012/0305100 A1 | 12/2012 | Bushman et al. | | |
| 2014/0170595 A1 * | 6/2014 | Williams | ............... | A61C 17/04 433/95 |
| 2014/0239551 A1 * | 8/2014 | Williams | ............... | A61C 17/04 264/328.13 |
| 2020/0397532 A1 * | 12/2020 | Bushman | ............... | A61C 17/13 |

* cited by examiner

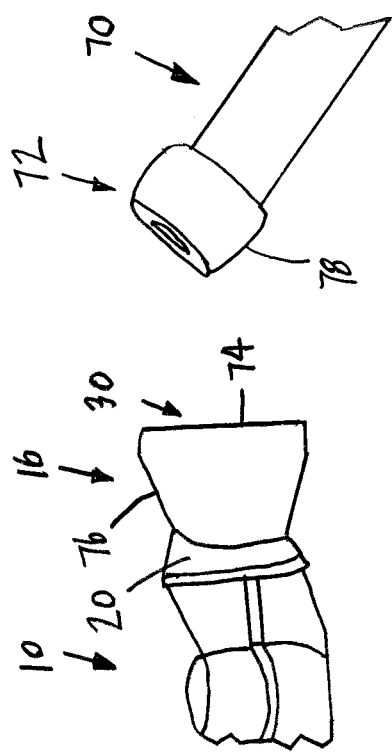
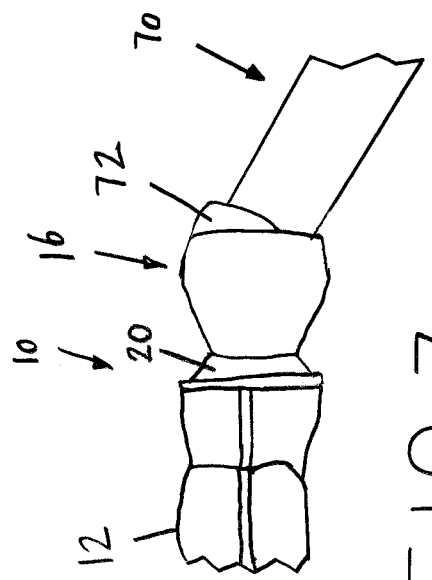
FIG. 6
FIG. 7

DISPOSABLE DENTAL VALVE DEVICE HAVING A SOCKET END

RELATED APPLICATION

This application is a continuation-in-part of U.S. patent application Ser. No. 14/925,749, filed on Oct. 28, 2015, which is now U.S. Pat. No., the disclosure of which is incorporated herein by reference.

BACKGROUND

This disclosure relates to a valve for a dental instrument and more particularly to a disposable dental valve device having a socket hose receiving end for providing enhanced maneuverability of the dental valve device during a dental procedure.

During a dental procedure it is important to be able to remove saliva, blood, tooth fragments, metals, and other debris from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector. A saliva ejector typically comprises a plastic flexible tube for placement in the mouth of a patient. The saliva ejector tube is connected to a valve which in turn is connected to a source of vacuum. Opening of the valve allows saliva to travel from the mouth of a patient through the saliva ejector, the valve, and tubing connected to the valve. In this manner, saliva is passed through the ejector tube and the valve to be disposed of in a sanitary manner. Once the procedure is completed, the ejector should be discarded and the valve should be sterilized by autoclaving to be used again. Although it is suggested to autoclave the valve after use, it is known that autoclaving is hardly ever done. Another device that is capable of removing solid materials is a high volume evacuator device or tip. The high volume evacuator tip is larger than the saliva ejector to be able to remove solid materials from a mouth of a patient. A high volume evacuator device generally consists of a tube that may be inserted into a mouth of a patient with the tube connected to a valve which is connected to a source of vacuum. As can be appreciated, opening of the valve allows solid materials to travel from the mouth of a patient through the high volume evacuator device, the valve, and tubing connected to the valve. Again, in this manner, debris may be removed from the mouth of the patient. After the dental procedure, the high volume evacuator tip is disposed of and the valve should be sterilized for reuse. However, although it is suggested to sterilize the valve after use, it is known that this suggested procedure is hardly ever followed. As can be appreciated, the saliva ejector and the high volume evacuator are used to remove liquids and debris from a mouth of a patient to prevent a patient from swallowing or aspirating liquids and debris produced during a dental procedure.

The saliva ejector valve and the high volume evacuator valve each has a valve body having a tip receiving end, a passage, a valve sealing member, and a hose receiving end. The valve sealing member has an opening that may be aligned with the passage to allow saliva and other material to pass when the valve sealing member is in an opened position. When the valve sealing member is in a closed position, the source of vacuum is cut off by the valve sealing member blocking the passage through the valve body. In this manner, the saliva ejector valve and the high volume evacuator valve may be opened or closed. However, due to the construction of the valve sealing member, an opening is formed through the valve body that is perpendicular to the passage formed in the valve body. The valve sealing member is inserted into the opening from either end of the opening when the valve is assembled.

Also, the hose receiving end of the dental valve is connected to a vacuum or suction hose which is connected to a source of vacuum. It is sometimes necessary to use a tailpiece between the hose receiving end of the dental valve and the hose. In either case, maneuvering the dental valve during a dental procedure is difficult because there is no freedom of movement between the dental valve and the hose. At times, in order to obtain a preferred positioning of the dental valve the hose may have to be bent or angled. This can constrict the hose, which may interrupt the flow of saliva or other materials from a mouth of a patient. The constricting of the hose should be avoided.

Although these devices and systems are beneficial, one disadvantage associated with their use is that the valves need to be cleaned after each use. During a dental procedure the valves invariably collect debris, body fluids, blood, and solids that adhere and accumulate upon the internal surfaces of the valve. The detritus that adheres to the internal surfaces of the valve can become a breeding ground for microbial contaminants. This buildup also contains microorganisms that remain in the valve system unless the valves are disassembled, the internal accumulated debris removed, and the valve sterilized.

As can be appreciated, if the valve is not cleaned and sterilized after each procedure there is the possibility of cross-contamination from one patient to another patient. In order to control infection and disease, the valve must be removed from service, disassembled, cleaned, sterilized, reassembled, checked, and then returned to service. To complicate matters, the valve may have various O-rings that need to be replaced in order for the valve to function properly. For example, the valve sealing member may include two O-rings that assist in holding the valve sealing member within the opening formed in the valve body. When disassembling the valve sealing member from the valve body, it is possible that the O-rings may become damaged. If this were to occur then the O-rings would have to be replaced. It is also possible that the O-rings may deteriorate over time and air may leak through the opening and the valve sealing member. If this were to occur then it is possible that the valve and the valve sealing member may malfunction during a dental procedure or operation. For example, the valve sealing member may be ejected from the valve body and any saliva, liquid, blood, or debris may spray out of the opening where the valve sealing member should be. Malfunctioning of the valve during an operation should be avoided because the operation will have to be paused or stopped and the operating room will have to be cleaned.

As pointed out above, a further disadvantage associated with the use of these known valves is that there is the possibility of cross-contamination between patients and/or dental care professionals. In order to prevent cross-contamination it becomes necessary to process these valves by cleaning and decontamination. Cleaning requires that all of the debris be removed from the valve as well as any organic and inorganic contamination. Removal of debris and contamination may be achieved either by scrubbing with a surfactant, detergent, and water, or by an automated process using chemical agents. One example of an automated process is the use of an ultrasonic cleaner. The valve also needs to be sterilized after debris and contaminants are removed.

Since the valves are constructed of metal they are heat-tolerant and may be sterilized by use of such methods such as steam under pressure (autoclaving), dry heat, or unsaturated chemical vapor. As can be appreciated, protecting against cross-contamination can be an expensive and time consuming proposition. Further, as noted above, the valves contain a number of O-rings that may need to be replaced. In order to accomplish this, an inventory of O-rings needs to be maintained. Also, in order to replace some of the O-rings, a lubricant may have to be used. Again, the lubricant will have to be inventoried so that a supply is readily available for use by service technicians. Having to inventory various supplies that may be required to service such valves is a cumbersome operation that many healthcare facilities may want to avoid.

As can further be appreciated, the saliva ejector and the high volume evacuator are used to remove liquids and debris from a mouth of a patient to prevent a patient from swallowing or aspirating liquids and debris produced during a dental procedure. Typically, when using these evacuator devices there is no backflow back into the mouth of a patient. However, there are times when backflow or a reverse flow may take place and previously removed liquids and debris may flow back into the mouth of the patient. It is also possible that if the systems are not properly maintained that fluids and debris from a previous patient may flow back into the mouth of a subsequent patient. These situations may be dangerous, are undesirable, and should be avoided.

Therefore, it would be desirable to have a valve for a dental instrument that is capable of easy movement and maneuverability during a dental operation. Another advantage would be that the dental valve be capable of preventing backflow. It would also be advantageous to have a valve for a dental instrument that is easy to install or insert on suction or vacuum tubing. It would further be desirable to have a valve that is disposable and can be easily removed from suction or vacuum tubing after a dental procedure has been completed.

BRIEF SUMMARY

In one form of the present disclosure, a disposable dental valve device comprises a valve body having an interior, a tip receiving end for receiving a tip, a socket hose receiving end for receiving a tube having a beaded end, a lumen formed between the tip receiving end and the socket hose receiving end, and a partial opening formed in the valve body, and a rotatable valve sealing body adapted to be inserted into the partial opening, the rotatable valve sealing body having a bore for alignment with the lumen formed between the tip receiving end and the socket hose receiving end.

In another form of the present disclosure, a disposable dental valve device comprises a valve body having an interior, a tip receiving end for receiving a tip, a socket hose receiving end for receiving a tube having a beaded end, a lumen formed between the tip receiving end and the socket hose receiving end, and a partial opening formed in the valve body and a rotatable valve sealing body adapted to be inserted into the partial opening, the rotatable valve sealing body having a bore for alignment with the lumen formed between the tip receiving end and the socket hose receiving end, the bore having a bore tip opening and a check valve for closing the bore tip opening.

In yet another form of the present disclosure, a disposable dental valve device comprises a valve body having an interior, a tip receiving end for receiving a tip, a socket hose receiving end, a lumen formed between the tip receiving end and the socket hose receiving end, and a partial opening formed in the valve body, a rotatable valve sealing body adapted to be inserted into the partial opening, the rotatable valve sealing body having a bore for alignment with the lumen formed between the tip receiving end and the socket hose receiving end, and a vacuum tube having a beaded end, the beaded end for insertion into the socket hose receiving end.

The present disclosure provides a disposable dental valve device for a dental instrument that is suitable for one time use and may be discarded after use.

The present disclosure provides a disposable dental valve device that is easy to install on and remove from a hose connected to a source of vacuum.

The present disclosure provides a valve for a dental instrument that is small, lightweight, easy to handle, easy to install, easy to move, and easy to operate.

The present disclosure also provides a valve for a dental instrument which is of simple construction and design and which can be easily employed with highly reliable results.

The present disclosure is related to a disposable dental valve device that does not require sterilization and prevents against cross-contamination.

The present disclosure provides a disposable dental valve device that may have an antimicrobial agent or chemical incorporated into the device to prevent any bacterial growth on the device. The antimicrobial agent or chemical may also be a coating applied to the disposable dental valve device.

The present disclosure is related to a disposable dental valve device that may be constructed of plastic that is recyclable or biodegradable to reduce the cost of the device and to allow the device to be disposable and discarded after a single use.

The present disclosure provides a disposable dental valve device that may be connected to or installed on tubing that is connected to a source of vacuum and also has a check valve for preventing a backflow condition.

The present disclosure is related to a disposable dental valve device that has a valve sealing body that is easy to manipulate during a dental operation to open or close the valve.

The present disclosure is also directed to a disposable dental valve device that has a socket hose receiving end that is capable of accepting or receiving a vacuum hose having a beaded end for providing maneuverability of the dental valve device during a dental procedure or operation.

The present disclosure is further directed to a disposable dental valve device that is constructed using a minimum number of parts to reduce the cost of manufacturing the disposable dental valve device.

The present disclosure provides a disposable dental valve device that provides freedom of movement between the dental valve device and a hose connected to the dental valve device.

The present disclosure is related to a disposable dental valve device having a check valve that has a valve sealing body that is easy to manipulate during a dental operation to open or close the valve and also incorporates a check valve to automatically prevent backflow of saliva, liquid, or other material.

These and other advantages of the present disclosure will become apparent after considering the following detailed specification in conjunction with the accompanying drawings, wherein:

BRIEF DESCRIPTION OF THE DRAWINGS

FIG. 6 is a partial side view of a disposable dental valve device constructed according to the present disclosure adjacent to a hose having a beaded end;

FIG. 7 is a partial side view of a disposable dental valve device constructed according to the present disclosure having the hose having the beaded end inserted into a socket hose receiving end of the disposable dental valve device;

DETAILED DESCRIPTION OF A PREFERRED EMBODIMENT

Figure 1:
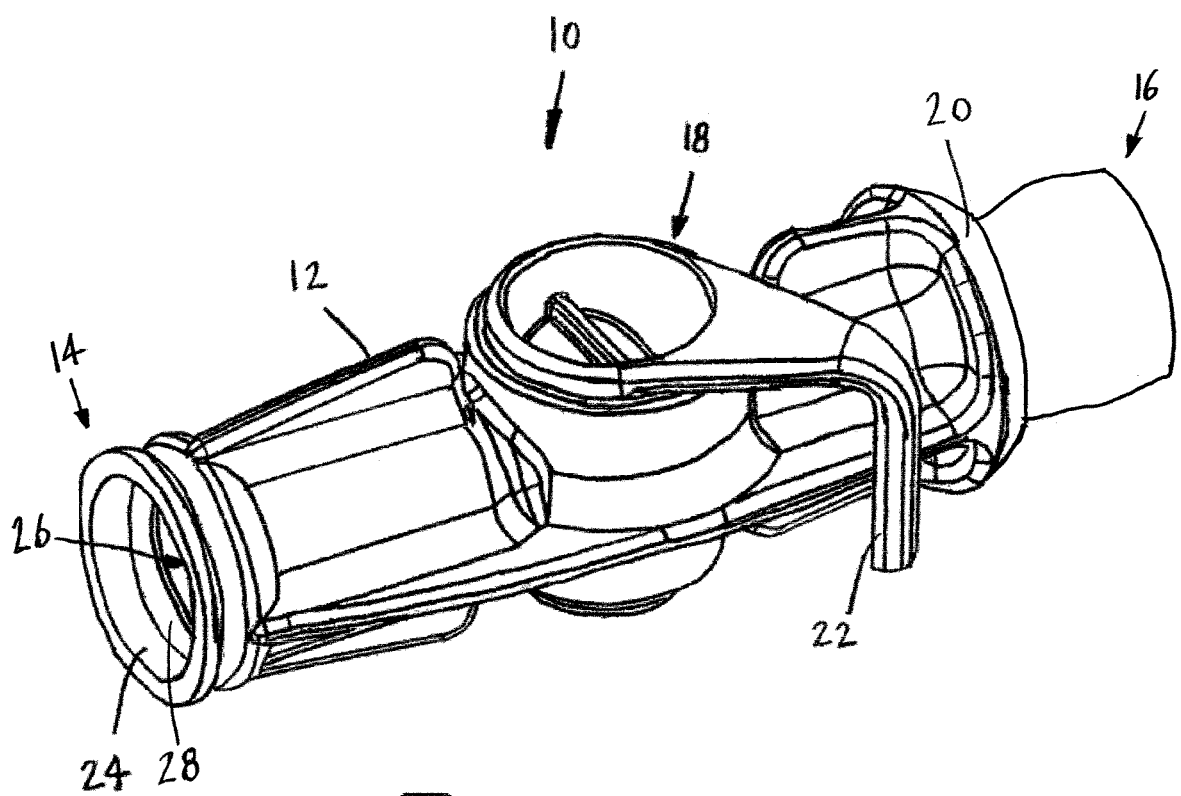
FIG. 1 is a perspective view of a disposable dental valve device constructed according to the present disclosure.

Referring now to the drawings, wherein like numbers refer to like items, number 10 identifies a disposable dental valve device for use with a dental system constructed according to the present disclosure. With reference now to FIG. 1, the valve 10 comprises a valve body 12 having a tip receiving end 14, a socket hose receiving end 16, and a rotatable valve sealing body 18. The tip receiving end 14 is adapted to receive an evacuator tip device (not shown) such as a saliva ejector or a high volume evacuator. The socket hose receiving end 16 is adapted to receive a vacuum line or a hose (not shown) which is connected to a suction system (also not shown). The device 10 also has a tapered section 20. The device 10 is constructed of material that allows the device 10 to be disposable and suitable for one time use. The device 10 also has a handle 22 for manual operation of the rotatable valve sealing body 18 of the device 10. Manual operation of the handle 22 will open the device 10, close the device 10, or partially open the device 10, as will be discussed more fully herein. As can be appreciated, a suction system provides suction through an evacuator tip device, the device 10, and a hose so that any debris or saliva that is introduced into an evacuator tip device is removed through an evacuator tip device, the valve 10, and a hose when the rotatable valve sealing body 18 of the device 10 is in an opened state or a partially opened state. The valve body 12 also has an opening 24 at the tip receiving end 14 and a passage or lumen 26 formed in the valve body 12. The lumen 26 continues through the valve body 12 to the socket hose receiving end 16. The tip receiving end 14 has an interior surface 28 that may be tapered so that the device 10 is capable of receiving various sized and shaped evacuator tip devices. In this manner, there is no need for an O-ring to be used or for the device 10 to have engineered therein an interior annular ring for receiving the O-ring for retaining a tip therein.

Figure 2:
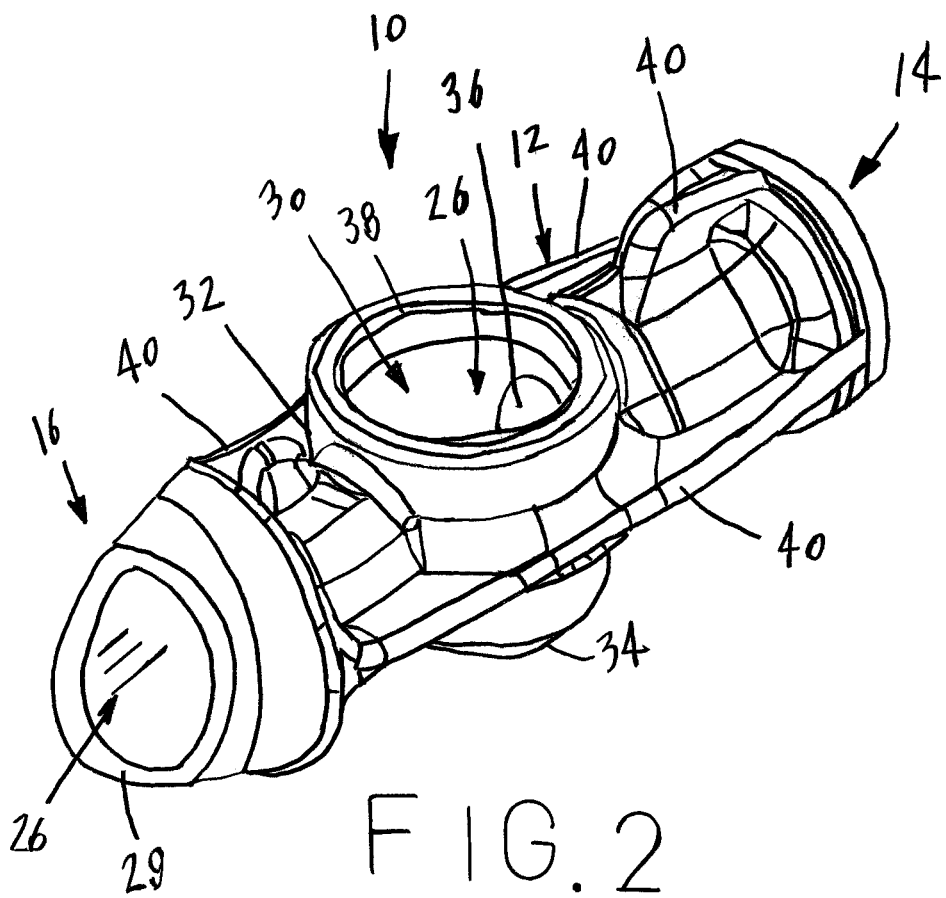
FIG. 2 is a perspective view of a disposable dental valve device constructed according to the present disclosure with a valve sealing body removed.

With reference now to FIG. 2, the device 10 is shown with the rotatable valve sealing device 18 being removed. The valve body 12 has the lumen 26 and a socket end opening 29 at the socket hose receiving end 16. As has been described, the lumen 26 continues through the valve body 12 to the tip receiving end 14. The valve body 12 also has a partial opening 30 formed on a top side 32 of the valve body 12. The partial opening 30 does not go all the way through the valve body 12. The partial opening 30 is blocked by a bottom 34 of the valve body 12. The device 10 also has the tapered section 20 between the partial opening 30 and the socket hose receiving end 16. An opening 36 is also shown in the lumen 26 between the tip receiving end 14 and the opening 30. Although not shown, a similar opening is also provided in the lumen 26 between the socket hose receiving end 16. An annular channel or ring 38 is formed in the opening 30 which is used to retain the rotatable valve sealing device 18 in place, as will be explained in further detail herein. The device 10 has numerous ribs 40 positioned about the valve body 12 to add strength to the device 10.

Figure 3:
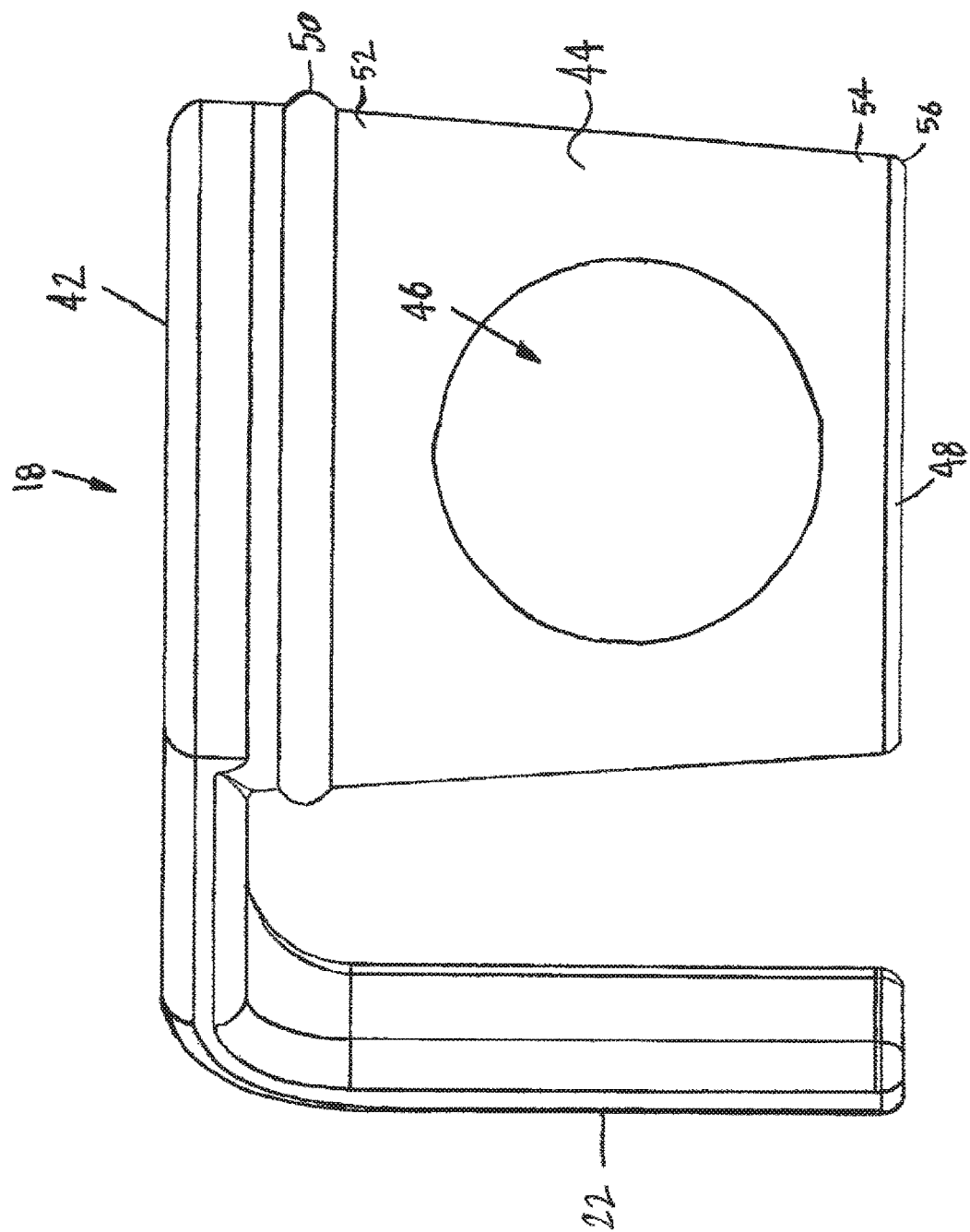
FIG. 3 a side perspective view of a valve sealing body constructed according to the present disclosure.

FIG. 3 shows the rotatable valve sealing body 18 removed from the device 10 in an opened position. The rotatable valve sealing body 18 has a top 42, a central body portion 44 having a bore 46, and a bottom 48. The handle 22 is part of the top 42. The central body portion 44 also has an annular ridge portion 50 near the top 42. The ridge portion 50 is capable of fitting into the ring 40 (FIG. 2) in a snap fit engagement to secure the rotatable valve sealing body 18 within the valve body 12. The central body portion 44 has an upper end 52 and a lower annular ring end 54 with the central body portion 44 tapering inwardly from the upper end 52 toward the lower end 54. The tapering of the central body portion 44 facilitates the insertion and removal of the rotatable valve sealing body 18 from the device 10. The bottom 48 has a chamfer 56 which also assists in insertion of the rotatable valve sealing body 18. The bore 46 is adapted to be aligned with the lumen 26 of the valve body 12. When the bore 46 is aligned with the lumen 26, the device 10 is in an opened position and the source of vacuum will draw any fluid or debris from the tip receiving end 14 through the lumen 26 and the bore 46 and out through the socket hose receiving end 16. In this manner, fluid and debris may be removed from a mouth during a dental procedure or operation. Although the ridge 50 is shown, it is possible that an annular ring may be formed in the central body portion 44 and an O-ring may be used to hold the valve sealing body 18 in place. Also, although one ridge 50 is depicted, it is contemplated that another ridge 50 may be formed on the central body portion 44 near the bottom 48 and another ring 40 be formed in the opening 30 near the bottom 36 to receive the second ridge 50 to further secure the valve sealing body 18 in place.

Figure 4:
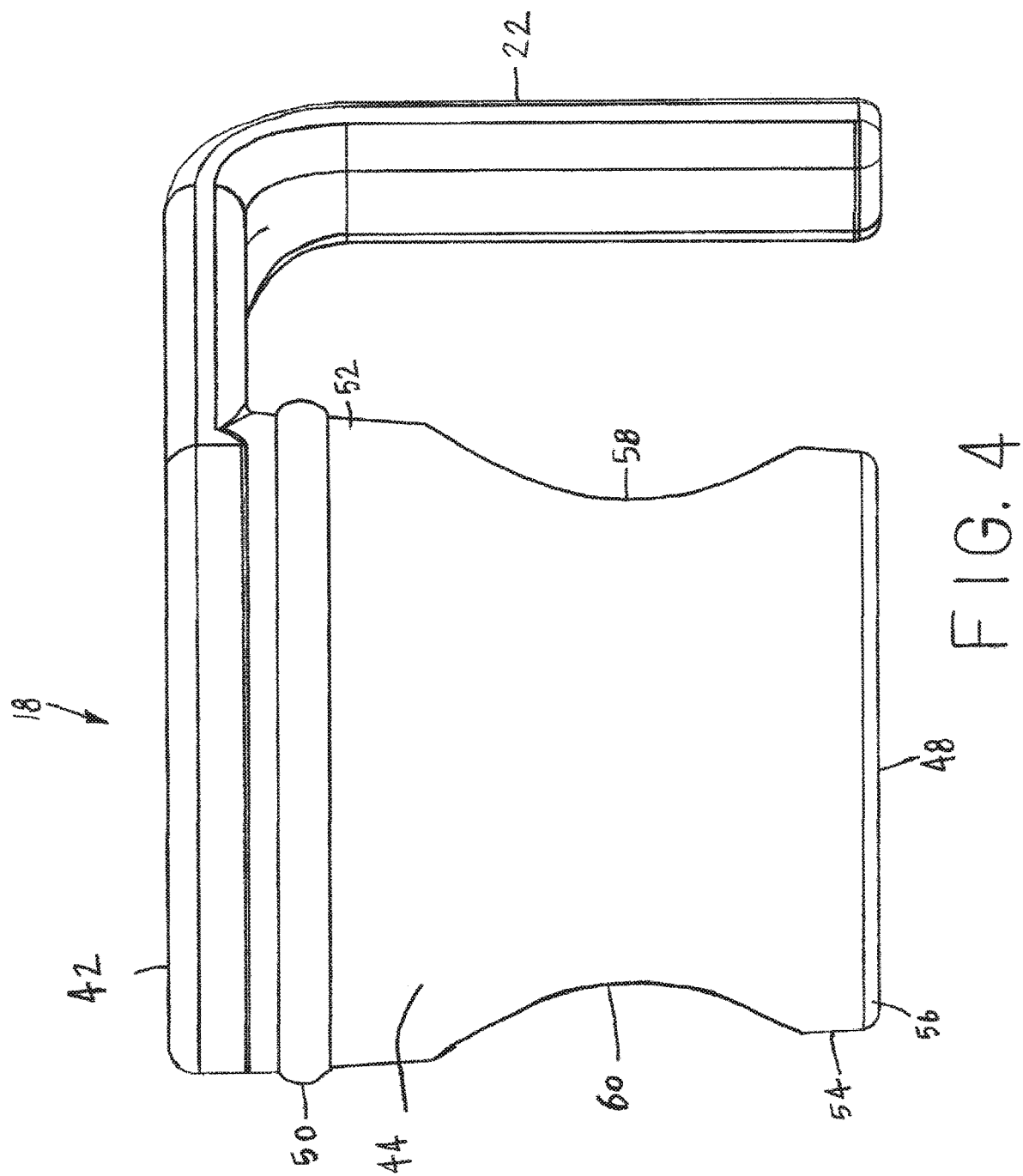
FIG. 4 is another side view of the valve sealing body constructed according to the present disclosure.

Referring now to FIG. 4, the rotatable valve sealing body 18 is illustrated removed from the device 10 in a closed position. The rotatable valve sealing body 18 has the top 42, the central body portion 44 having a first opening 58 and a second opening 60, and the bottom 48 having the chamfer 56. The openings 58 and 60 are aligned with the bore 46 (FIG. 3). When the rotatable valve sealing body 18 is in the closed position, the central body portion 44 will block any air flow through the valve body 12. In essence, the bore 46 is no longer aligned with the lumen 26 formed in the valve body 12. The rotatable valve sealing body 18 is moved into the closed position by use of the handle 22. The openings 58 and 60 are concave which allows the rotatable valve sealing body 18 to rotate. The central body portion 44 is also shown having the upper end 52 and the lower annular ring end 54. The central body portion 44 tapers inwardly from the upper end 52 toward the lower end 54. The upper end 52 has a width and the lower end 54 has a width with the width of the upper end 52 being greater than the width of the lower end 54.

Figure 5:
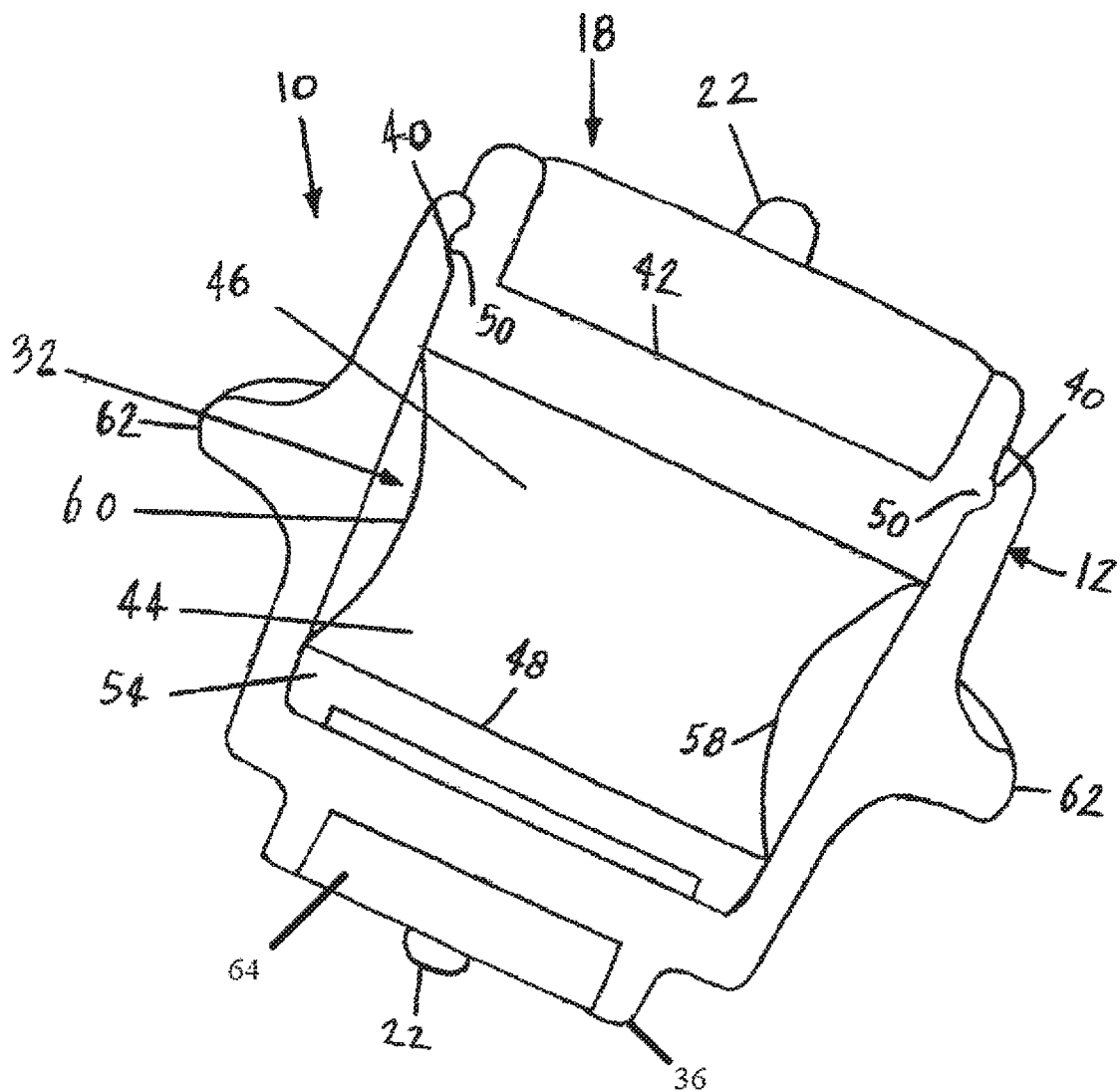
FIG. 5 is a cross-sectional view of the disposable dental valve device constructed according to the present disclosure.

FIG. 5 is a cross-sectional view of the disposable dental valve device 10 with the rotatable valve sealing body 18 in the closed position. The device 10 has the valve body 12 having the rotatable valve sealing body 18 mounted therein. The rotatable valve sealing body 18 is held in place by use of the ridge 50 being snapped into place within the ring 40. The bottom 48 of the rotatable valve sealing body 18 is adjacent to the bottom 36 of the valve body 12. In this manner, the rotatable valve sealing body 18 is able to rotate within the valve body 12. Further, the bottom 36 ensures that the opening 32 (FIG. 2) is a partial opening and the opening 32 does not go all the way through the valve body 12. The opening 32 reduces the risk that the rotatable valve sealing body 18 will become disengaged during use or that the valve 10 will fail during use. The rotatable valve sealing body 18 also has the bore 46 formed therein between the openings 58 and 60. As previously described, the openings 58 and 60 are concave and the sealing body 18 has the lower end 54 of the central body portion 44 that is engaged by friction near the bottom 36 within the opening 32 formed in the valve body 12. The valve body 12 also has exterior ribs 62 that add strength to the valve body 12 and also assist in forming the valve body 12. The handle 22 is also shown as being part of the device 10. The bottom 36 has a central indentation 64 formed within the lower annular ring end 54.

With reference now to FIG. 6, a partial view of the disposable dental valve device 10 is shown just prior to a vacuum hose 70 having a beaded or ball end 72 being inserted into the socket hose receiving end 16. The vacuum hose 70 is connected to a source of vacuum (not shown). The socket hose receiving end 16 has the opening 30 and a hemispherical cavity 74. The socket hose receiving end 16 also has a tapered cylindrical outer side 76 that tapers from the opening 30 toward the rotatable valve sealing device 18. The device 10 has the tapered section 20 between the partial opening 30 and the socket hose receiving end 16. The beaded end 72 is capable of being inserted or snapped into the socket hose receiving end 16 by forcing the beaded end 72 into the hemispherical cavity 74 through the opening 30 so that there is a press fit engagement between the socket hose receiving end 16 and the beaded end 72. The beaded end 72 has an exterior surface 78 that is sized and shaped to contact the hemispherical cavity 74 so that the socket hose receiving end 16 may rotate, swivel, or be easily maneuvered. In particular, during a dental procedure, it may be desired to move the disposable dental valve device 10 to orientate a tip (not shown) in a mouth of a patient. The beaded end 72 and the socket hose receiving end 16 also provide a seal so that no air, saliva, or other materials escape out from the socket hose receiving end 16.

FIG. 7 shows a partial view of the disposable dental valve device 10 with the beaded end 72 being inserted into the socket hose receiving end 16. The disposable dental valve device 10 is at an angle with respect to the hose 70. The beaded end 72 and the socket hose receiving end 16 also provide a seal between each other so that no air, saliva, liquids, blood, tooth particles, or other matter may escape out from the socket hose receiving end 16. With the beaded end 72 snapped into the socket hose receiving end 70 the device 10 is capable of being easily maneuvered, swiveled, or rotated to any desired position or orientation. The tapered section 20 between the partial opening 30 and the socket hose receiving end 16 is also shown.

Figure 8:
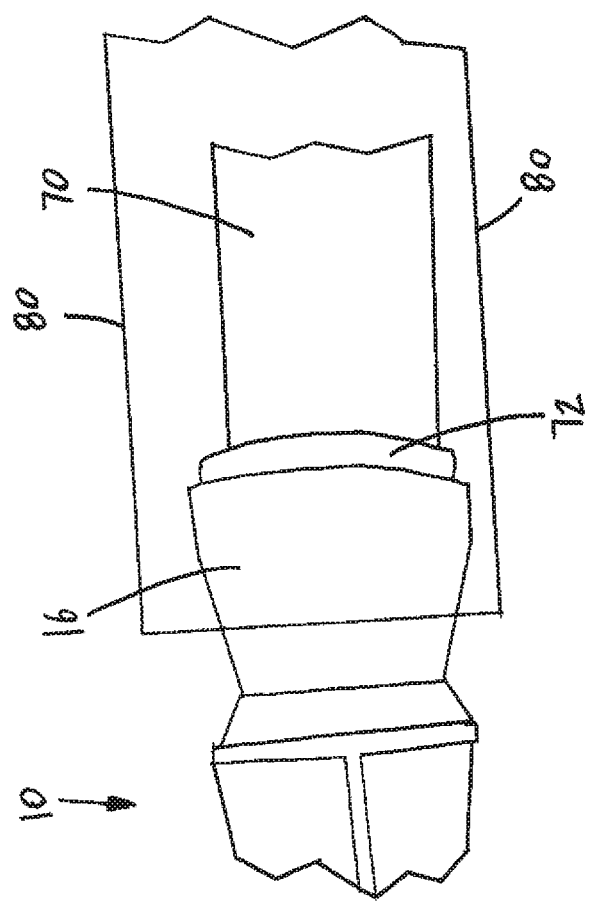
FIG. 8 is a partial side view of a disposable dental valve device constructed according to the present disclosure having the hose having the beaded end inserted into a socket hose receiving end of the disposable dental valve device and a protective sheath inserted over the hose, the beaded end, and the socket hose receiving end.

Referring now to FIG. 8, a protective sheathing 80 has been inserted over the hose 70, the beaded end 72, and the socket hose receiving end 16 of the disposable dental valve device 10 to protect the hose 70 and the beaded end 72 from any contaminants. The protective sheathing 74 may be used so that the hose 70 and the beaded end 72 do not have to be changed after each dental procedure. With the protective sheathing 74 in place, the protective sheathing 74 does not interfere with the operation of the valve device 10 or the socket hose receiving end 16 and the hose 70.

In operation of the device 10, the beaded end 72 of the hose 70 is inserted into the socket hose receiving end 16 through the opening 30. The exterior surface 78 of the beaded end 72 contacts the hemispherical cavity 74 to secure the beaded end 72 in the opening 30. The beaded end 72 is capable of being inserted or snapped into the socket hose receiving end 16 by forcing the beaded end 72 into the hemispherical cavity 74 through the opening 30 so that there is a press fit engagement between the exterior surface 78 and the hemispherical cavity 74. An evacuator tip (not shown) is inserted into the tip receiving end 14 and then placed in a mouth of a dental patient. The handle 22, which may include an indicator to indicate the closed position and the opened position, is manually operated to open the device 10. Once the device is in the opened position, air is allowed to flow through the tip, the tip receiving end 14, the lumen 26, the bore 46 of the rotatable valve sealing body 18, the socket hose receiving end 16, the beaded end 72, the hose 70, and into a suction system (not shown). When suction is not needed during a dental procedure, the handle 22 is moved to the closed position. Further, once a dental procedure has been completed, the handle 22 is moved to the closed position, the device 10 is easily separated from the beaded end 72 to disconnected the device 10 from the hose 70. Once disconnected, the device 10 may be disposed of by any suitable manner. A new device 10 is then connected to the beaded end 72 of the hose 70 to perform or initiate another dental procedure.

Figure 9:
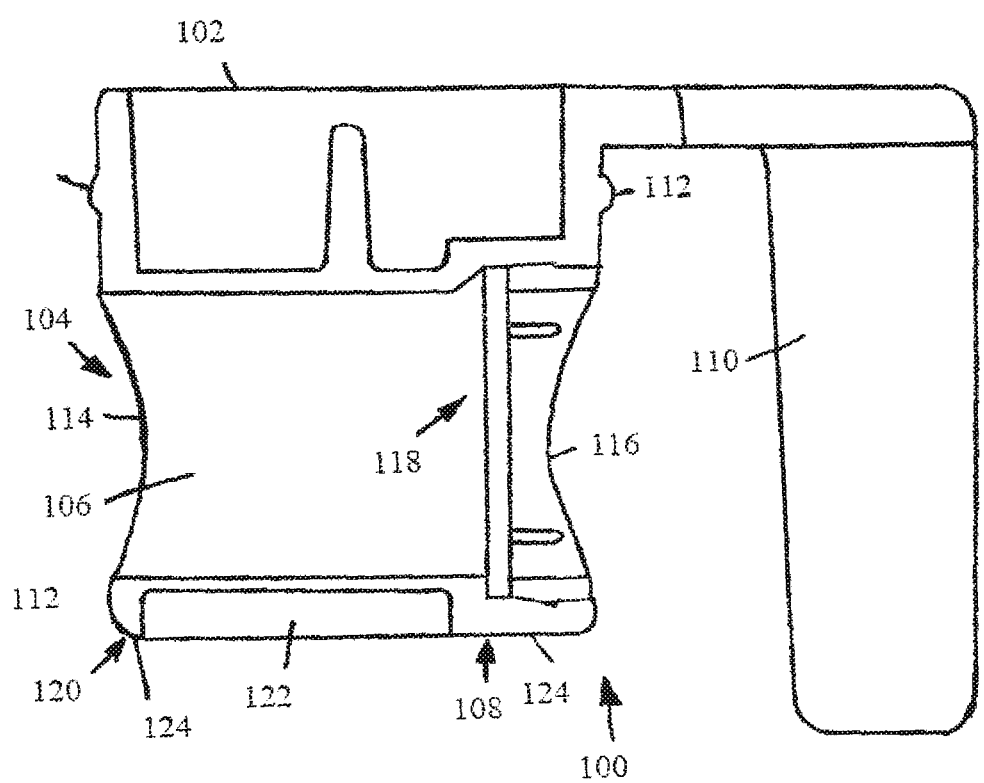
FIG. 9 is a cross-sectional view of a valve sealing body constructed according to the present disclosure with a check valve in a closed position.

FIG. 9 shows a cross-sectional view of another rotatable valve sealing body 100 that may be used with the disposable dental valve device 10. The body 100 has been removed from the valve body 12. The rotatable valve sealing body 100 has a top 102, a central body portion 104 having a bore 106, and a bottom 108. A handle 110 is part of the top 102. The central body portion 104 also has an annular ridge portion 112 near the top 102. The ridge portion 112 is capable of fitting into the ring 40 (FIG. 2) in a snap fit engagement to secure the rotatable valve sealing body 100 within the valve body 12. The bore 106 is adapted to be aligned with the lumen 26 of the valve body 12. The bore 106 of the rotatable valve sealing body 100 also has a first opening 114 and a second opening 116. The first opening 114 is used to be aligned with the opening 38 (FIG. 2) in the valve body 12. The second opening 116 is used to be aligned with the lumen 26 (FIG. 2) of the valve body 12. The second opening 116 has a check valve 118 positioned therein to selectively open or close the second opening 116. The check valve 118 is provided for allowing liquid, saliva, or debris to pass from the tip receiving end 14, the check valve 118, the bore 106, the first opening 114, and out the socket hose receiving end 16 when the check valve 118 is opened. However, the check valve 118 also prevents any liquid, saliva, or debris from passing or traveling from the socket hose receiving end 16, the first opening 114, the bore 106, and through the check valve 118 when the check valve 118 is closed. The check valve 118 will close when a reduced pressure occurs from an interaction of a mouth of a patient on an evacuator tip device. For example, a patient may be requested to close the mouth of the patient around the evacuator tip device. When this occurs, a reduced pressure results in which a backflow may occur. The check valve 118 is sensitive to this pressure differential and will close to prevent backflow. The check valve 118 is shown in the closed position in FIG. 9.

As can be appreciated, when the bore 106 is aligned with the lumen 26, the device 100 is in an opened position and the source of vacuum will draw any fluid, saliva, or debris from the tip receiving end 14 through the lumen 26 and the bore 106 and out through the socket hose receiving end 16. The check valve 118 is in an opened position or configuration at this particular time. In this manner, fluid, saliva, and debris may be removed from a mouth of a patient during a dental procedure or operation. Although the ridge 112 is shown, it is possible that an annular ring may be formed in the central body portion 104 and an O-ring may be used to hold the valve sealing body 100 in place. Also, although one ridge 112 is depicted, it is contemplated that another ridge 112 may be formed on the central body portion 104 near the bottom 108 and another ring 40 be formed in the opening 32 near the bottom 36 to receive the second ridge 112 to further secure the valve sealing body 100 in place.

The rotatable valve sealing body 100 also has an annular ring 120 formed in the bottom 108. A central indentation 122 is formed within the annular ring 120. The annular ring 120 has a surface 124 that contacts an interior surface (not shown) of the bottom 36 of the valve body 12. The annular ring 120, the central indentation 122, and the surface 124 facilitate smooth and easy rotation of the rotatable valve sealing body 100 within the valve body 12. The annular ring 120, the central indentation 122, and the surface 124 further allow rotation of the body 100 without being bound up within the valve body 12.

Figure 10:
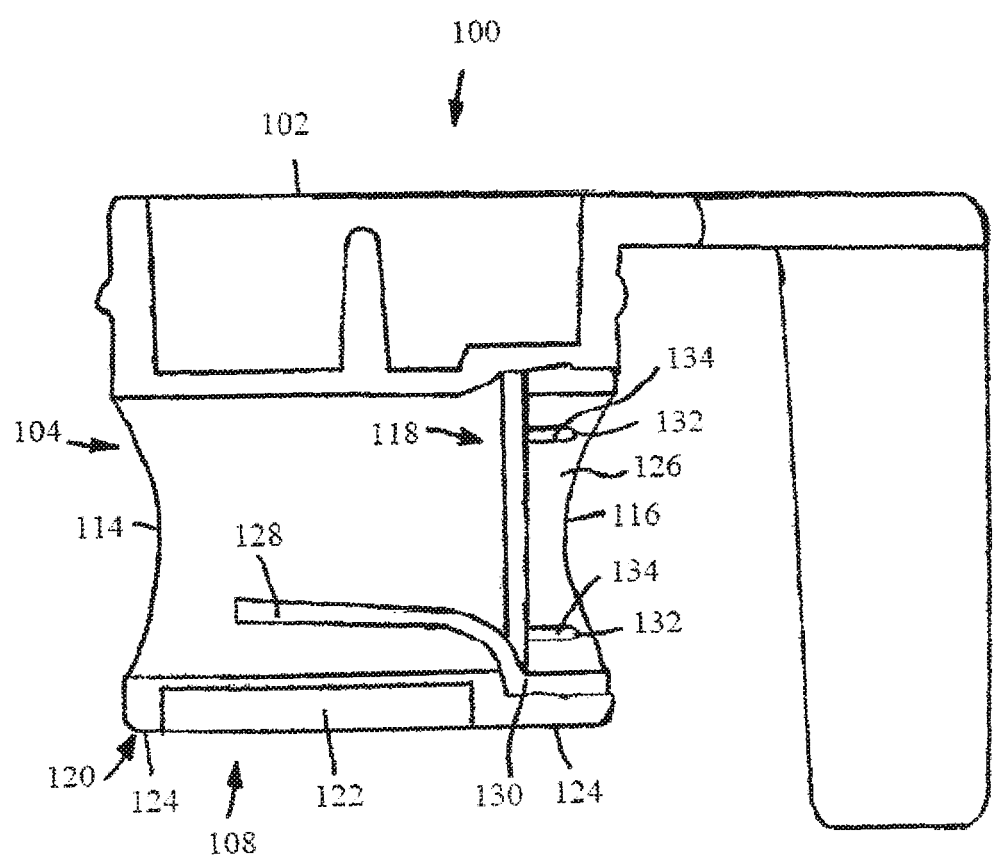
FIG. 10 is a cross-sectional view of the valve sealing body shown in FIG. 9 with a check valve an opened position.

Referring now to FIG. 10, the check valve 118 of the rotatable valve sealing body 100 is illustrated in the opened position. The check valve 118 comprises a housing 126 having a flap portion 128 being connected at an end portion 130. The connection of the flap portion 128 at the end portion 130 allows the check valve 118 to open or close. The end portion 130 may be a hinge device that allows the flap portion 128 to move relative to the housing 126. The housing 126 also has retaining rib openings 132 formed in the housing 126. The rotatable valve sealing body 100 has retaining ribs 134 formed in the second opening 116. The openings 132 are used to receive the ribs 134 therein for retaining the check valve 118 in the second opening 116. In this manner, a snap fit engagement of the check valve 118 within the second opening 116 is provided. Although the openings 132 and the ribs 134 are shown, it is possible that other retention or engagement type constructions are contemplated, such as using an adhesive or forming the check valve 118 and the body 100 as a unitary piece or construction. As can be appreciated, when the flap portion 128 is in the opened position the flap portion 128 will only be within the bore 106 of the body 100. The rotatable valve sealing body 100 is also shown having the top 102, the central body portion 104 having the first opening 114 and the second opening 116, the bottom 108, the annular ring 120, the central indentation 122, and the surface 124. The openings 114 and 116 are concave and this provides for smooth rotation of the body 100 within the valve body 12.

Figure 11:
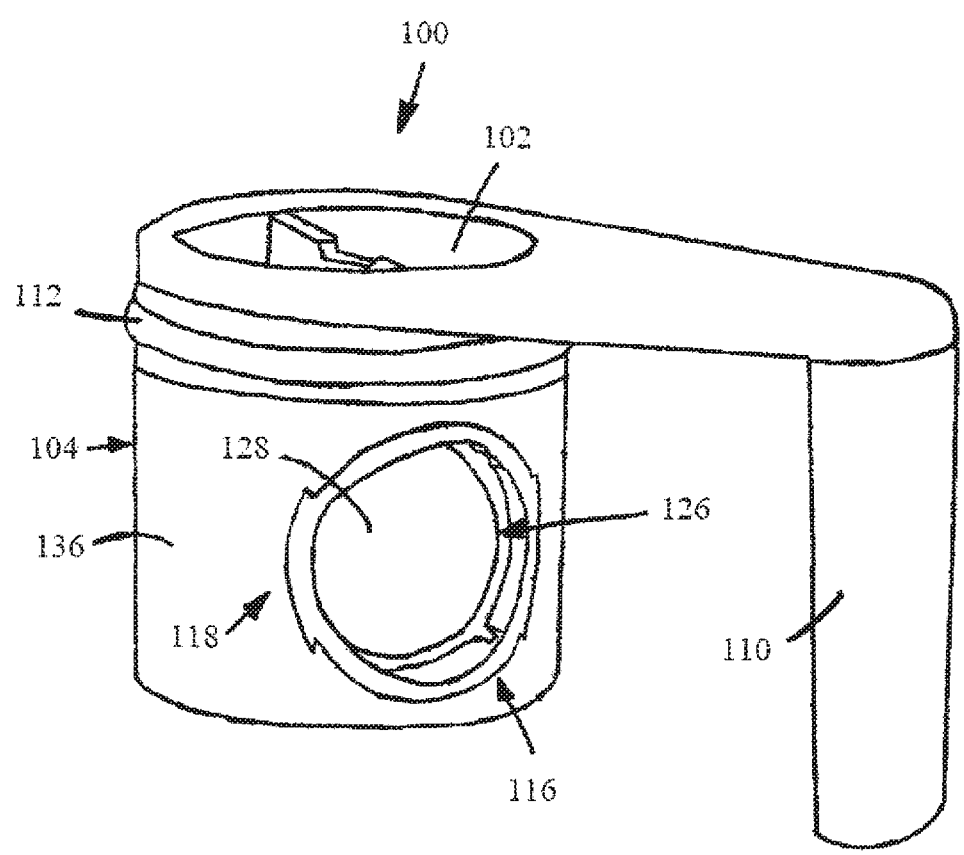
FIG. 11 is a perspective view of the valve seal body constructed according to the present disclosure with the check valve shown in the closed position.

FIG. 11 shows a perspective view of the rotatable valve sealing body 100 with the check valve 118 in the closed position. The housing 126 is positioned in or on the second opening 116. The flap portion 128 is positioned up against the housing 126. With the flap portion 128 in this position, the closed position, no fluid, saliva, or debris will flow through the body 100. The body 100 has the central body 104 44 having an exterior surface 136. The annular ridge portion 112 is positioned near the top 102. Also, the handle 110 is part of the top 102.

Figure 12:
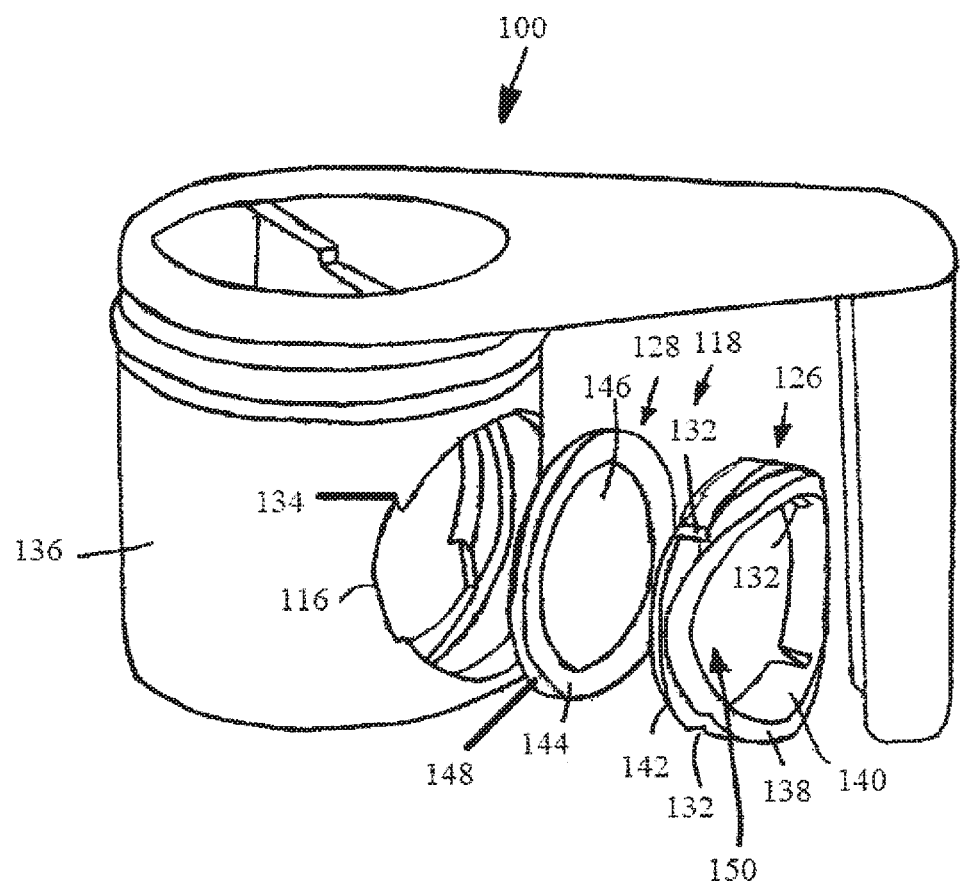
FIG. 12 is a perspective view of the valve seal body constructed according to the present disclosure with the check valve removed from the valve seal body and shown in an exploded view.

With reference now to FIG. 12, a perspective view of the rotatable valve sealing body 100 is shown with the check valve 118 removed from the second opening 116. The check valve 118 is also depicted in an exploded view in that the housing 126 and the flap portion 128 have been separated. As has been discussed, the housing 126 and the flap portion 128 may be a unitary construction. The housing 126 has a front surface 138 that is concave to follow the concave second opening 116 so that the front surface 138 is flush with the exterior surface 136 when the housing 126 is inserted into the second opening 116, as is depicted in FIG. 11. The housing 126 also has a center portion 140 and a back 142. The center portion 140 and the back 142 have the openings 132 formed therein. Although four openings 132 are shown, it is contemplated that more or less openings 132 may be provided in the housing 126. The flap portion 128 has a front side 144, a center portion 146, and a back side 148. The front side 144 and the center portion 146 are sized and shaped to fit over the center portion 140 and the back 142 of the housing 126. As can be appreciated, the flap portion 128 is a solid piece and the housing 126 has a central opening 150. The flap portion 128 is used to cover or close the central opening 150. It is also possible that the back 142 may have a recess, groove, or rabbet formed therein to receive or seat the flap portion 128 therein. The flap portion 128 may be connected to the housing 126 in any suitable manner. The second opening 116 has the ribs 134 that are used to capture the openings 132 to hold the housing 126 in place in or around the second opening 116. Although four ribs 134 are depicted, as with the openings 132, more or less ribs 134 are possible.

Figure 13:
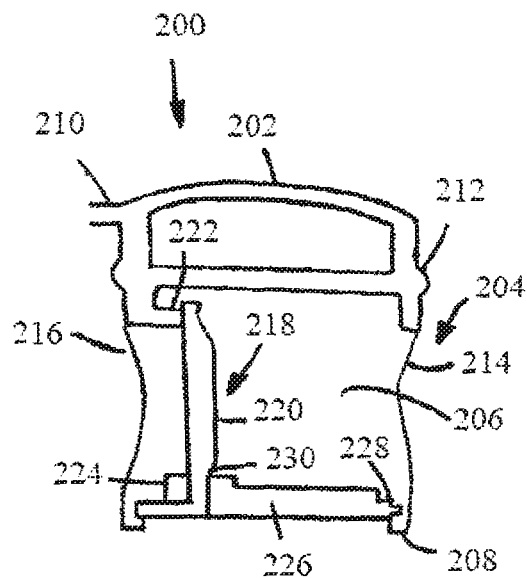
FIG. 13 is a partial cross-sectional view of another embodiment of a valve sealing device having a check valve shown in a closed position constructed according to the present disclosure.
Figure 14:
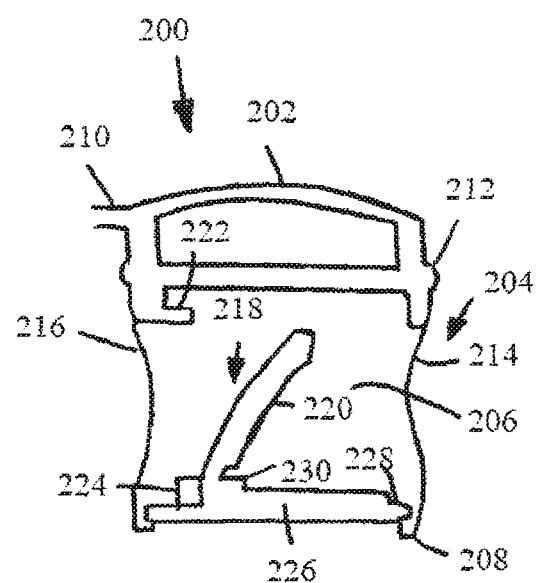
FIG. 14 is a partial cross-sectional view of another embodiment of a valve sealing device having a check valve shown in a partially open position constructed according to the present disclosure.

FIGS. 13 and 14 illustrate another embodiment of a rotatable valve sealing body 200 constructed according to the present disclosure. The rotatable valve sealing body 200 is shown in cross-section in both FIGS. 13 and 14. Also, the rotatable valve sealing body 200 may replace the rotatable valve sealing body 18 and be inserted into the body 12. The rotatable valve sealing body 200 comprises a top 202, a central body portion 204 having a bore 206, and a bottom 208. A portion of handle 210 is shown which is part of the top 202. The central body portion 204 also has an annular ridge portion 212 near the top 202. The bore 206 is adapted to be aligned with the lumen 26 of the valve body 12. The bore 206 of the rotatable valve sealing body 200 also has a first opening 214 and a second opening 216. The first opening 214 is used to be aligned with the opening 38 (FIG. 2) in the valve body 12. The second opening 216 is used to be aligned with the lumen 26 (FIG. 2) of the valve body 12. The second opening 216 has a check valve 218 positioned therein to selectively open or close the second opening 216. The check valve 218 is provided for allowing liquid, saliva, or debris to pass from the tip receiving end 14, the check valve 218, the bore 206, the first opening 214, and out the socket hose receiving end 16 when the check valve 218 is opened. However, the check valve 218 also prevents any liquid, saliva, or debris from passing or traveling from the socket hose receiving end 16, the first opening 214, the bore 206, and through the check valve 218 when the check valve 218 is closed. The check valve 218 will close when a reduced pressure occurs from an interaction of a mouth of a patient on an evacuator tip device. As has been indicated, a patient may be requested to close the mouth of the patient around the evacuator tip device. When this occurs, a reduced pressure results in which a backflow may occur. The check valve 218 is sensitive to this pressure differential and will close to prevent backflow.

The check valve 218 has a flap portion 220 that seals against a top seat portion 222 and a bottom seat portion 224 that are formed in the body 200. The flap portion 220 is connected to a bottom plate member 226. The bottom plate member 226 snaps into an opening 228 formed in the bottom 208 of the body 200. The flap portion 220 may be connected to the bottom seat portion 224 by use of a hinge 230 or by any other suitable connection means. When manufacturing the body 200, the flap portion 220 is inserted into the opening 228 and then the bottom plate member 226 is snapped into place in the opening 228 in the bottom 208.

Figure 15:
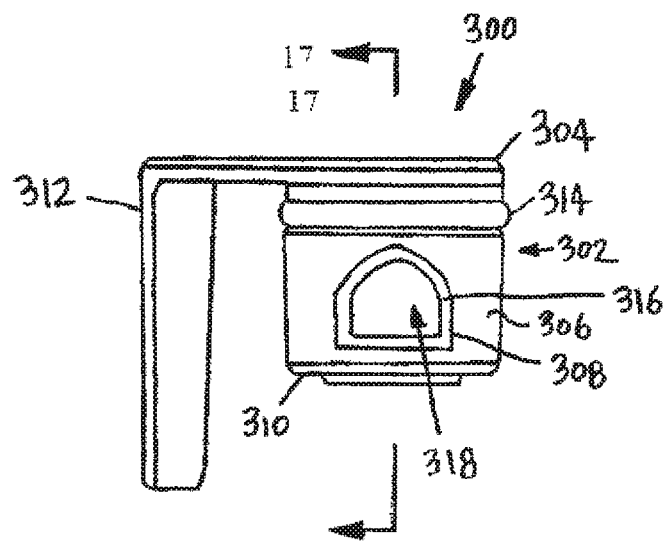
FIG. 15 is a perspective view of another embodiment of a rotatable valve sealing device having a check valve with the check valve shown in a closed position.

FIG. 15 is a perspective view of another embodiment of a rotatable valve sealing device having a check valve 300. The device 300 is capable of being inserted into the valve body 12 (FIG. 2). The device 300 has a rotatable valve sealing body 302 having a top 304, a central body portion 306 having a bore 308, and a bottom 310. A handle 312 is attached to or part of the top 304. The central body portion 306 also has an annular ridge portion 314 near the top 304. The ridge portion 314 is capable of fitting into the ring 40 (FIG. 2) in a snap fit engagement to secure the device 300 within the valve body 12. The bore 308 is adapted to be aligned with the lumen 26 of the valve body 12. The bore 308 of the device 300 also has a first opening 316 that is used to be aligned with the tip receiving end 14 (FIG. 2) in the valve body 12. In the bore 308 is a check valve 318 positioned therein to selectively open or close the bore 308. The check valve 318 is provided for allowing liquid, saliva, or debris to pass from the tip receiving end 14, the bore 308, the check valve 318, and out the socket hose receiving end 16 (FIG. 2) when the check valve 318 is opened. However, the check valve 318 also prevents any liquid, saliva, or debris from passing or traveling from the hose receiving end 16, the bore 308, and through the check valve 318 when the check valve 318 is closed. The check valve 318 will close when a reduced pressure occurs from an interaction of a mouth of a patient on an evacuator tip device. For example, a patient may be requested to close the mouth of the patient around the evacuator tip device. When this occurs, a reduced pressure results in which a backflow may occur. The check valve 318 is sensitive to this pressure differential and will close to prevent backflow. The check valve 318 is shown in the closed position in FIG. 15.

Figure 16:
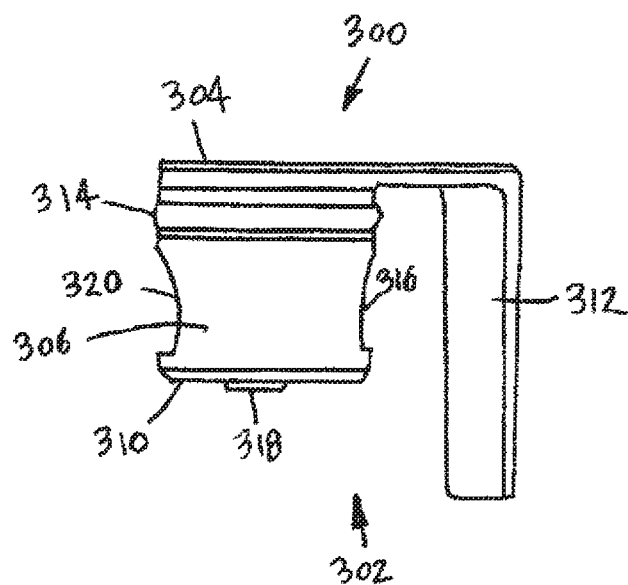
FIG. 16 is a side perspective view of the rotatable valve sealing device shown in FIG. 15.

FIG. 16 illustrates a side perspective view of the rotatable valve sealing device 300. The device 300 has a second opening 320 that is used to be aligned with the opening 38 (FIG. 2) of the socket hose receiving end 16 in the valve body 12. The device 300 is also shown to have the rotatable valve sealing body 302 having the top 304, the central body portion 306, and the bottom 310. The handle 312 is attached to or part of the top 304. The central body portion 306 also has the annular ridge portion 314 near the top 304. The first opening 316 is also shown. The check valve 318 is further shown extending out of the bottom 310 of the device 300, as will be explained in detail further herein.

Figure 17:
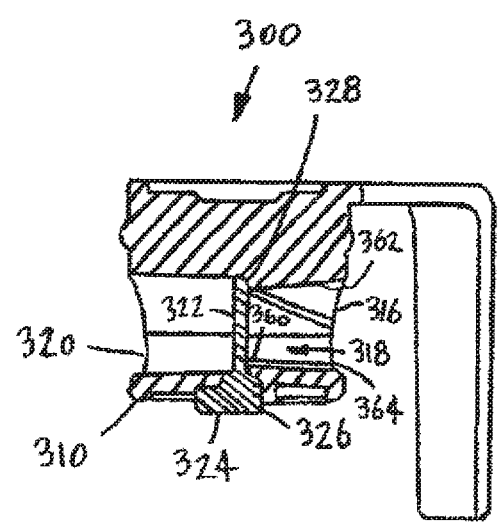
FIG. 17 is a cross-sectional view of the rotatable valve sealing device shown in FIG. 15 taken along the plane of line 17-17.

FIG. 17 depicts a cross-sectional view of the rotatable valve sealing device shown in FIG. 15 taken along the plane of line 17-17. The device 300 has the bore 308 that extends through the central body portion 306 between the first opening 316 and the second opening 320. The check valve 318 comprises a flap portion 322 and a retention portion 324. The check valve 318 is inserted into the bore 308 through an opening 326 formed in the bottom 310. As can be appreciated, the check valve 318 is located within the bore 308 and offset from the first opening 316. The retention portion 324 is retained against the bottom 310. The bore 308 has an upper seat or stop portion 328 against which the flap portion 322 may be positioned when in the closed position. The upper stop portion 328 prevents the flap portion 322 from moving past a vertical position or toward the first opening 316. In this manner, when a reduced pressure occurs from an interaction of a mouth of a patient on an evacuator tip device the flap portion 322 of the check valve 318 will press against the upper stop portion 328 and prevent a backflow condition from occurring. The flap portion 322 prevents any liquid, blood, saliva, or debris present in the suction system, the hose, or the bore 308 from flowing into a mouth of a patient. The bore 308 may also be comprised having a lower seat or stop portion 360 against which the flap portion 322 may be positioned when in the closed orientation. The bore 308 has an upper slanted surface 362 that slants downward from the first opening 316 toward the upper stop portion 328. The bore 308 also has a lower slanted surface 364 that slants upwardly from the first opening 316 toward the lower stop portion 360. Also, the first opening 316 may be smaller in diameter than the second opening 320.

Figure 18:
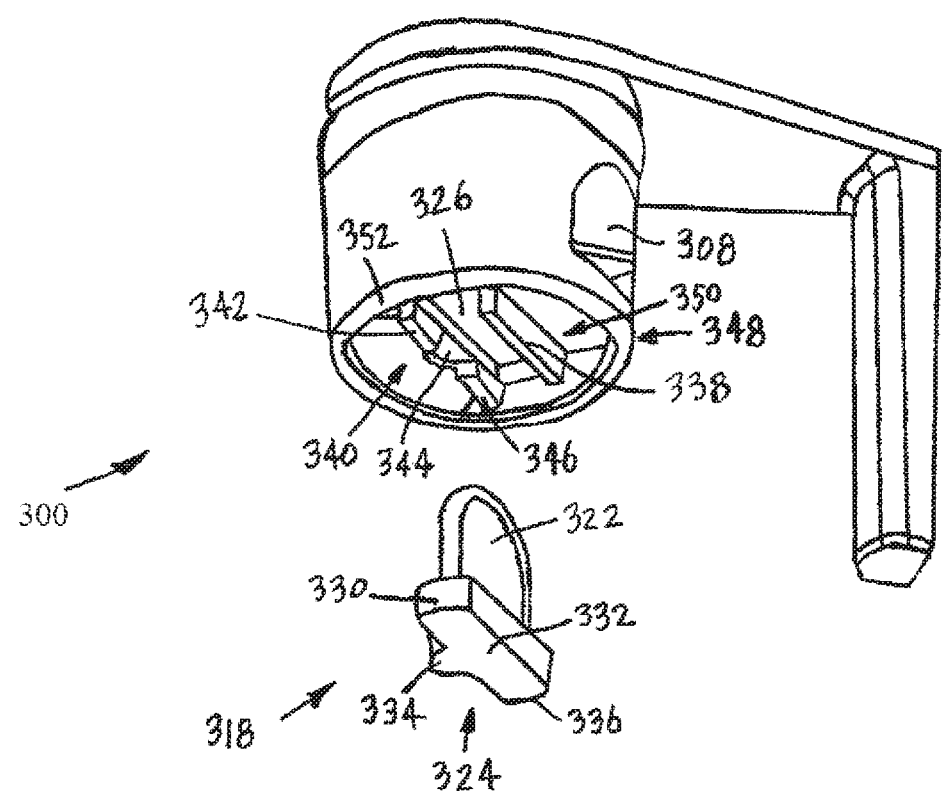
FIG. 18 is an exploded view of the rotatable valve sealing device.

With reference now to FIG. 18, an exploded view of the rotatable valve sealing device 300 is shown. In this particular view, the check valve 318 has been removed from the bore 308 and the opening 326 formed in the bottom 310. The check valve 318 has the flap portion 322 and the retention portion 324. The flap portion 322 is generally hemispherical in shape. The retention portion 324 has a first end 330, a central portion 332 having an extension member 334, and a second end 336. The bottom 310 of the device 300 has the opening 326, a first ledge member 338, and a second ledge member 340 having a first ledge portion 342, a central indented ledge portion 344, and a second ledge portion 346. The central indented ledge portion 344 is for capturing the central portion 332 to retain the retention portion 324 in the bottom 310 of the device 300. The first ledge member 338 and the second ledge member 340 are also used to hold the retention portion 324 in place on the bottom 310 of the device 300. The flap portion 322 is sized and shaped to fit through the opening 326 to slide the flap portion 322 in place within the bore 308. The bottom 310 has an annular ring 348 formed in the bottom 310. A central indentation 350 is formed within the annular ring 348. The annular ring 348 has a surface 352 that contacts an interior surface (not shown) of the bottom 34 of the valve body 12. The annular ring 348, the central indentation 350, and the surface 352 facilitate smooth and easy rotation of the rotatable valve sealing body 302 within the valve body 12. The annular ring 348, the central indentation 350, and the surface 352 further allow rotation of the body 302 without being bound up within the valve body 12. The surface 352 may also be eased or chamfered.

In operation of for example the device 10, with the body 300 as part of the device 10, the socket hose receiving end 16 of the device 10 has the beaded end 72 of the hose 70 inserted therein. The hose 70 is connected to a suction system (not shown) and an evacuator tip (not shown) is inserted into the tip receiving end 14 and then placed in a mouth of a dental patient. The handle 312, which may include an indicator to indicate the closed position and the opened position, is manually operated to open the device 10. Once in the opened position, air is allowed to flow through the evacuator tip, the tip receiving end 14, the lumen 26, the check valve 318, the bore 308 of the rotatable valve sealing body 300, the socket hose receiving end 16 and into a suction system. In the event that reduced pressure occurs from an interaction of a mouth of a patient on an evacuator tip device, the check valve 318 will close and no backflow will be allowed from the suction system or the valve device 10. When suction is not needed during a dental procedure, the handle 312 is moved to the closed position. Further, once a dental procedure has been completed, the handle 312 is moved to the closed position, and the device 10 is easily separated from the beaded end of the hose 70. Once the device 10 is disconnected from the beaded end 72 of the hose 70, the device 10, which includes the check valve 318, may be disposed of by any suitable manner. A new device 10 is then connected to the beaded end 72 of the hose 70 by use of the socket hose receiving end 16. With the new valve device 10 installed, another dental procedure may be initiated.

The disposable dental valve device 10 and the various components described herein, such as the rotatable valve sealing devices 100, 200, and 300, may be formed of any suitable material such as plastic, polyethylene, and high density polyethylene or any other suitable material that is disposable and recyclable. It is also possible that the device 10 may be constructed of a material that will allow the device 10 to be reused after the device 10 is cleaned or sanitized. Any suitable plastic may be used to construct the device 10 so that the device 10 may withstand use in a dental operation or procedure. It is also possible and contemplated to incorporate an antimicrobial agent or chemical in the plastic or to provide a coating of an antimicrobial agent on the plastic to further prevent cross-contamination when using the device 10. As can be appreciated, the antimicrobial agent may be incorporated into any of the components of the device 10.

From all that has been said, it will be clear that there has thus been shown and described herein a disposable dental valve device which fulfills the various advantages sought therefore. It will become apparent to those skilled in the art, however, that many changes, modifications, variations, and other uses and applications of the subject disposable dental valve device are possible and contemplated. All changes, modifications, variations, and other uses and applications which do not depart from the spirit and scope of the disclosure are deemed to be covered by the disclosure, which is limited only by the claims which follow.

What is claimed is:

1. A disposable dental valve device comprising:
   a valve body having an interior, a tip receiving end for receiving a tip, a socket hose receiving end, a lumen formed between the tip receiving end and the socket hose receiving end, and a partial opening formed in the valve body;
   a hose having a beaded end for being inserted into the socket hose receiving end for a press fit engagement between the socket hose receiving end and the beaded end for the socket hose receiving end to be able to rotate or swivel relative to the beaded end with a portion of the beaded end capable of extending out of the socket hose receiving end when the socket hose receiving end is rotated or swiveled relative to the beaded end;
   a rotatable valve sealing body adapted to be inserted into the partial opening, the rotatable valve sealing body having a bottom having an opening, a bore for alignment with the lumen formed between the tip receiving end and the socket hose receiving end, the bore having a bore tip opening; and
   a check valve positioned in the bore and the opening in the bottom of the rotatable valve sealing body.

2. The disposable dental valve device of claim 1 wherein the socket hose receiving end further comprises a cavity.

3. The disposable dental valve device of claim 1 wherein the check valve further comprises a flap portion positioned in the bore and a retention portion retained against the bottom of the rotatable valve sealing body.

4. The disposable dental valve device of claim 1 wherein the bottom of the rotatable valve sealing body further comprises a first ledge member and a second ledge member having a first ledge portion, a central indented ledge portion, and a second ledge portion and the check valve further comprises a flap portion positioned in the bore and a retention portion retained against the bottom of the rotatable valve sealing body with the retention portion having a first end, a central portion having an extension member, and a second end with the first end and the second end for being positioned between the first ledge member and the second ledge member and the extension member for fitting into the central indented ledge portion.

5. The disposable dental valve device of claim 1 further comprising a rib to strengthen the valve body.

6. The disposable dental valve device of claim 1 wherein the disposable dental valve device is constructed of plastic.

* * * * *